United States Patent [19]

Saubolle et al.

[11] Patent Number: 4,820,953
[45] Date of Patent: Apr. 11, 1989

[54] RATE OF ASCENT MONITOR USING PIEZOELECTRIC TRANSDUCER

[76] Inventors: Malcolm Saubolle, 2699 Battleford Rd., T.H. #13, Mississauga, Ontario, Canada, L5N 3R9; Italo De Blasi, 5 Longford Ct., Whitby, Ontario, Canada, L1R 1C5; Stanley Livshitz, 38 Plum Tree Way, Willowdale, Ontario, Canada, M2R 3J2

[21] Appl. No.: 124,050

[22] Filed: Nov. 23, 1987

[51] Int. Cl.4 ............................................. H01L 41/08
[52] U.S. Cl. ...................................... 310/338; 310/330; 310/337; 310/324; 310/319; 73/865.1; 367/134
[58] Field of Search ............... 310/337, 338, 339, 324, 310/330–332; 364/418; 367/134; 73/290 V, 291, 495, 502, 517 R, 517 AV, 715, 723, 754, DIG. 4

[56] References Cited

U.S. PATENT DOCUMENTS

| | | | |
|---|---|---|---|
| 3,239,696 | 3/1966 | Burkhalter | 310/338 X |
| 3,307,052 | 2/1967 | Neilson et al. | 310/338 |
| 3,469,231 | 9/1969 | Geiling et al. | 367/134 X |
| 3,561,831 | 12/1969 | Alibert et al. | 310/338 |
| 3,696,610 | 10/1972 | Charbonnier | 73/865.1 |
| 3,992,948 | 11/1976 | D'Antonio et al. | 73/865.1 |
| 3,992,949 | 11/1976 | Edmondson | 73/865.1 |
| 4,193,010 | 3/1980 | Kompanek | 310/324 X |
| 4,563,758 | 1/1986 | Paternostro | 367/134 X |
| 4,583,484 | 4/1986 | Freund | 73/865.1 X |
| 4,589,283 | 5/1986 | Morrison, Jr. | 73/865.1 |
| 4,604,737 | 8/1986 | Hoffman | 367/134 X |
| 4,658,358 | 4/1987 | Leach et al. | 73/865.1 X |

Primary Examiner—Mark O. Budd
Attorney, Agent, or Firm—Ridout & Maybee

[57] ABSTRACT

A rate of ascent monitor for drivers uses a sound transducer with velocity characteristics, preferably a diaphragm type piezoelectric transducer, to sense rate of pressure change, and a threshold detector connected to the transducer to drive an indicator providing a warning of an excessive rate of ascent. A second threshold detector can be used to discriminate between descending and ascending motion. The device can be a compact wrist mounted unit.

4 Claims, 2 Drawing Sheets

RATE OF ASCENT MONITOR USING PIEZOELECTRIC TRANSDUCER

This invention relates to a device for monitoring the rate of ascent of divers or similar applications.

Divers using underwater breathing apparatus for diving must control their rate of ascent towards the water surface, if they are not to suffer dangerous, unpleasant and possibly fatal decompression effects, commonly referred to as the "bends". There is a need for a simple, inexpensive device for monitoring the rate of ascent of a diver, and indicating whether a safe rate of ascent is being maintained. Continuous monitoring of watches and pressure gauges does not provide a convenient solution, particularly under adverse conditions, and accepted rule of thumb methods (such as maintaining rate of ascent below that of the divers smallest exhaled air bubbles) may be unreliable or difficult to put into effect, particularly in adverse lighting conditions. Divers may also become disoriented, and become unaware of whether they are ascending or descending, and a device that would provide an easy and immediate indication of a diver's direction of vertical movement would therefore be useful. There are also other circumstances in which a device providing an indication of excessive rates or direction of pressure change would be useful, such as in hyperbaric chambers.

U.S. Pat. No. 3,992,949 (Edmondson) discloses a rate of ascent monitoring instrument for divers, incorporating a clock having a dial visible through a spiral capillary pressure gauge. An appropriate rate of ascent is achieved by matching the movement of a meniscus in the gauge with a moving second hand of the clock. Clearly this requires significant concentration on the instrument by the diver.

U.S. Pat. No. 3,463,015 (Rosario et al) discloses an arrangement providing a simulation of degree of absorption of gas by the diver's tissues.

U.S. Pat. No. 3,457,393 (Kidd et al) discloses an analogue computing device also depending upon such a simulation.

U.S. Pat. No. 4,604,737 (Hoffmann) discloses an electronic pressure monitoring and warning device for SCUBA divers. A pressure transducer produces a signal proportional to the ambient pressure to control a variable frequency oscillator, the output of which is mixed with a fixed frequency signal. This provides an output signal which is applied to a relatively complex digital counter circuit configured to detect and signal both excessive rates of pressure change and excessive maximum pressure.

French Patent Application No. 2,551,564 discloses a monitoring device for divers incorporating a microcomputer which accepts input data from pressure transducers and is programmed to calculate permissible rates of ascent based on a mathematical model incorporated in a program controlling the computer.

U.S. Pat. No. 4,674,429 (Buckle et al) discloses a rate of ascent monitoring system which controls rate of ascent by venting gas from a lifting bag.

U.S. Pat. No. 3,992,948 (D'Antonio) discloses a further rate of ascent monitor utilizing a simulation by discharge of capacitors of the rate of desorption of nitrogen from a diver's blood.

A principal object of the present invention is to provide a rate of ascent or descent monitor which is inexpensive to manufacture and simple to use, thus rendering it suitable for widespread use and fulfilling a need for such a device at a sufficiently low price to be attractive to recreational divers.

A primary disadvantage of known devices in this field is that they are dependent upon the use of pressure transducers of one kind or another, transducers having an appropriate range of sensitivity being comparatively expensive; moreover, since the critical parameter to be monitored is rate of change of pressure, the pressure signal must either be checked continuously by the user against some time reference, or some means must be provided to differentiate the pressure signal from the transducer to provide a signal proportional to the rate of change of pressure.

We have found that by utilizing a sound transducer with "velocity" characteristics, such as a piezo-electric transducer which reacts to changes in applied force, rather than a pressure or force transducer which is a displacement transducer and reacts to the magnitude of an applied force, a surprisingly simple, compact and effective rate of ascent monitor can be produced.

SHORT DESCRIPTION OF THE DRAWINGS

Figure 2:
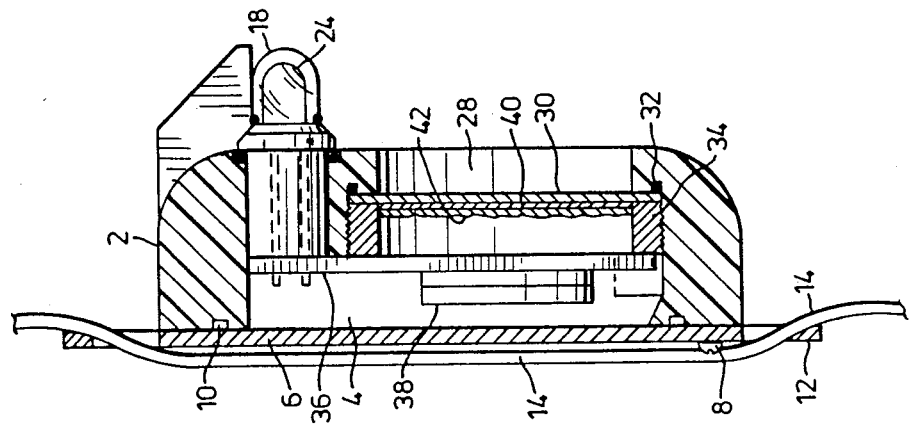
FIG. 2 is a section through the device on the line 2—2 in FIG. 1.
Figure 1:
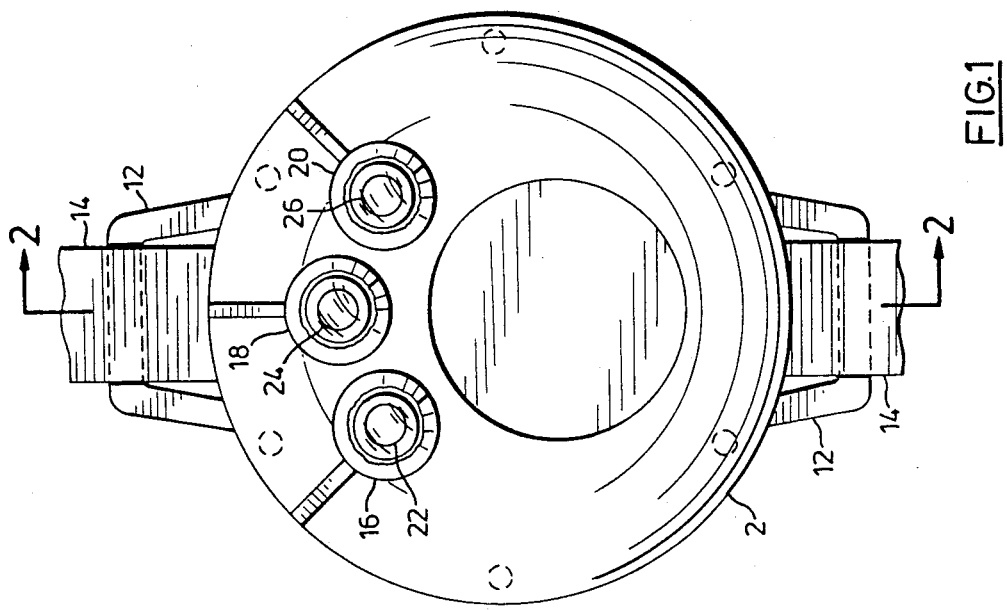
FIG. 1 is a plan view of a device in accordance with the invention.
Figure 3:
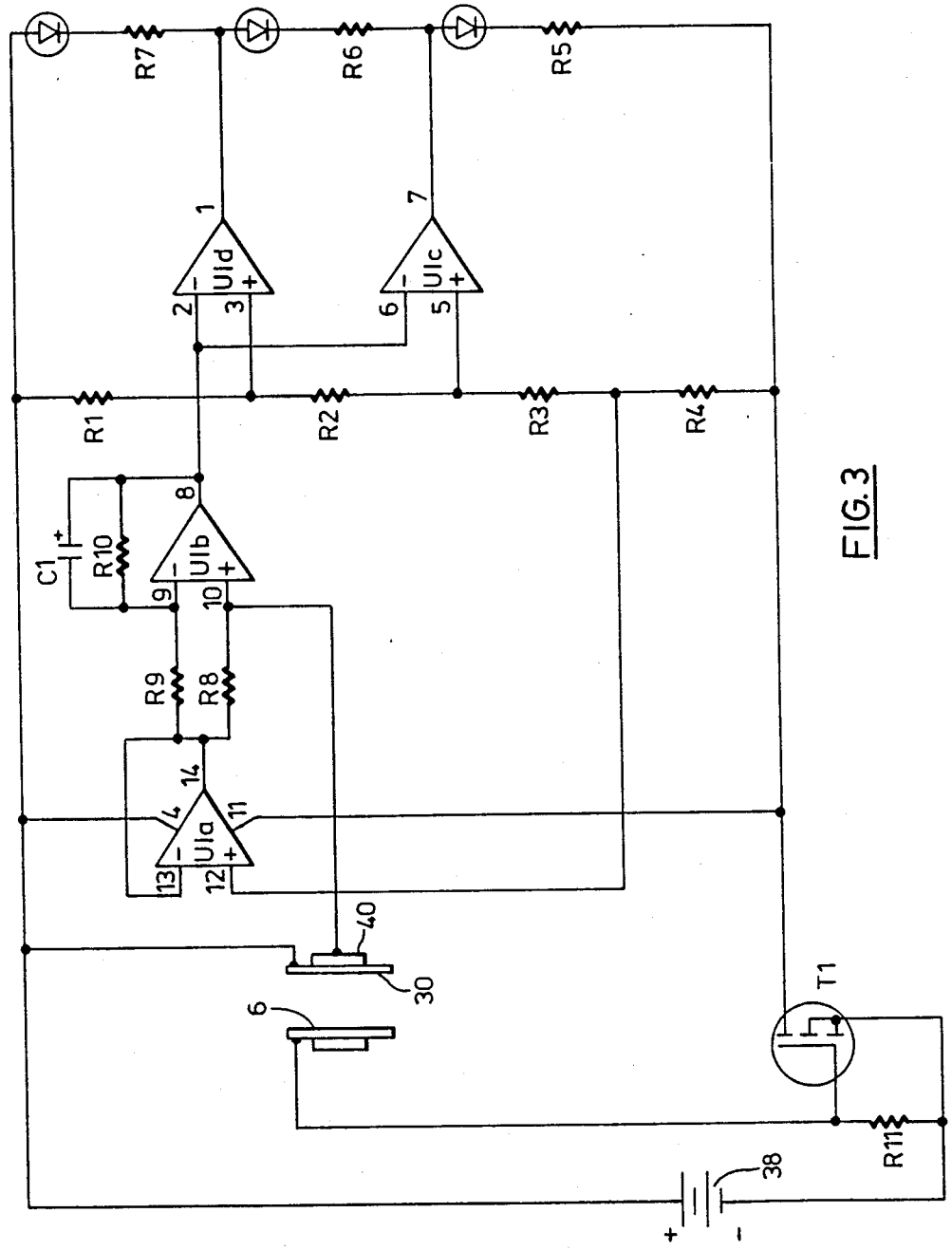
FIG. 3 is a schematic diagram of the electronic circuit of the device.

The device comprises a moulded synthetic plastic body 2 defining an internal chamber 4 in its rear surface, which chamber is closed by a backplate 6 secured by screws 8 and hermetically sealed by an O-ring 10. The backplate may be provided with edge loops 12 to receive a strap 14 for securing the device to the wrist of a user.

The front surface of the body 2 has three small apertures, receiving hollow lenses 16, 18, 20, hermetically sealed to the body so as to house the bodies of three light emitting diodes 22, 24, 26, emitting respectively red, green and amber light upon energization. A larger opening 28 is closed by a diaphragm 30, a hermetic seal being provided by a seal ring 32 against which the diaphragm is pressed by a collar 34 threaded into the body 2. Within the chamber 4 is mounted a printed circuit board 36 which mounts the light emitting diodes 22, 24, 26 and a battery 38, typically formed by two 3 volt lithium cells. Other components carried by the board 36 will be apparent from the following description of the electronic circuit of the device.

Referring to FIG. 2, the metal diaphragm 30 supports on its inner surface a piezo-electric ceramic wafer 40, the combination of diaphragm and wafer forming a piezo-electric sound transducer element of a type well known and mass produced for many applications, such as microphones, buzzers and sound transducers. Such a device, coupled to a high impedance load, produces an output potential in response to deformation of the ceramic wafer, which output potential is proportional to the rate of deformation. Such devices are often referred to as having a "velocity" characteristic, to distinguish them from transducers, such as conventional pressure transducers, which provide an output signal proportional to actual movement or change in dimension of a sensing element, such transducers being referred to as displacement transducers. Other types of velocity transducer are known, but diaphragm type piezo-electric ceramic transducers are uniquely suited to implementation of the present invention because of their low cost, and because their electrical and physical characteristics turn out to be well suited to the present application. The diaphragm is connected to the positive supply line of the circuit, which is connected to the positive terminal of the battery 38, the negative terminal of which is connected to the backplate 6 through a high value resistor R11 (typically about 1 megohm). The backplate is also connected to the gate of a field effect transistor T1 whose drain is connected to the negative terminal of the battery and whose source provides the negative supply line of the remainder of the circuit. When a diver using the device enters water so as to submerge the device, sufficient conduction occurs between the backplate and the diaphragm to turn on the transistor T1 and complete a circuit between the battery and the remainder of the circuit. This circuit is based upon a readily available integrated circuit, such as the LM324 from National Semiconductor, containing four comparators U1a, U1b, U1c and U1d. A potentiometer ladder formed by resistors R1, R2, R3 and R4 is connected between the positive and negative supply lines to provide reference potentials to the positive inputs of comparators U1a, U1c and U1d. Comparator U1a is connected as a voltage follower to establish a low impedance reference ground potential for the comparator U1b which is connected as a high input impedance preamplifier for changes in potential at the electrical contact to the wafer 40, using a high value load resistor R8. In order to avoid leakage currents in the high impedance portion of the circuit, which may cause spurious outputs, the free inner surfaces of the diaphragm and wafer are covered with a waterproof dielectric material 42 such as silicone grease. In order to eliminate from the amplifier output transient signals due to sounds, water movements and impacts, a high value capacitor C1 is connected across resistor R10, which together with a resistor R9, sets the gain of the amplifier. The effect of this capacitor is to reduce the gain of the amplifier to near zero for signals, so that it forms a low pass filter other than very slowly changing signals.

The output of the amplifier is applied to the inverting inputs of the comparators U1c and U1d, each of which receives different reference potentials. That of comparator U1c is set to provide a threshold at or slightly above or below the no signal output potential of amplifier U1a, indicative of a stationary position or a negligible rate of ascent or descent, whilst that of comparator U1d is set so as to provides a threshold corresponding to the signal provided by amplifier U1a in response to a specific rate of outward flexure of the diaphragm 30 and thus the wafer 40.

In use, and assuming use by a diver, the device is switched on as it enters the water. As long as the diver is descending, increasing hydrostatic pressure flexes the diaphragm 30 inwards, producing a signal at the output of amplifier U1a which falls below the threshold of both comparators U1c and U1d. The output potential of these comparators thus approaches that of the positive supply, such that the supply potential appears across the amber light emitting diode (LED) 26 and its series resistor R5, with the result that an amber light is displayed through lens 20. When the diver ceases to descend there is no longer any change in the pressure applied to diaphragm 30, and therefore no signal output from the wafer 40. In the embodiment shown, the reference potential supplied to the amplifier U1a is less than the threshold of the comparator U1c, and therefore the amber light continues to be displayed. If the diver begins to ascend at a significant rate, the diaphragm will flex outwardly at a rate sufficient to provide a signal causing the output potential from amplifier U1c, whose output potential thus falls towards that of the negative supply, resulting in the LED 26 being turned off, and the green LED 28 being turned on so as to display a green light. If the rate of ascent rises above a safe level, the threshold of comparator U1d is also exceeded, so that its output potential also falls towards that of the negative supply, in turn turning off the green LED 28 and turning on the red LED 30.

It will be appreciated that the comparator thresholds are chosen to provide switching of the LED's at appropriate rates and directions of pressure change. Additional comparators and LED's could be provided at signal additional rates of pressure change, but it is thought that the simplicity of the present arrangement is advantageous. Likewise only a single comparator need be used, if it is only desired to signal excessive rates of ascent. The LED's could of course be replaced by alternative signalling devices such as buzzers of different pitch. Moreover, by adding a contact behind the diaphragm to sense excessive inward flexure of the latter, it is possible also to signal that the diver has reached a dangerous depth by connecting the contact the negative line through a warning device. The calibration of the device can of course be altered according to the application for which it is intended.

We claim:

1. A submersible rate of ascent monitor for divers, comprising a body defining a chamber, a diaphragm of a piezoelectric sound transducer closing an opening in said body so as hermetically to seal the chamber from the surrounding water, a piezoelectric ceramic wafer of the sound transducer being bonded to the inside surface of the diaphragm, a low pass filter electrically connected to the transducer output to exclude therefrom signals due to sounds, water movements and impacts, a threshold detector circuit within the chamber and receiving an output of the low pass filter, said threshold detector having a first threshold corresponding to a rate of decrease of ambient pressure indicative of an excessive rate of ascent, and indicator means driven by the threshold detector circuit to indicate an excessive rate of descent.

2. A monitor according to claim 1, wherein the threshold detector circuit has a second threshold corresponding to a very small or zero rate of pressure change, and further indicator means driven by said threshold detector to indicate whether a diver is ascending or descending.

3. A monitor according to claim 1, wherein the ceramic wafer is covered with a moisture resistant dielectric layer.

4. A monitor according to claim 1, including a wrist strap for securing the monitor to the wrist of a user.

* * * * *